(12) United States Patent
Takezawa

(10) Patent No.: US 8,281,349 B2
(45) Date of Patent: Oct. 2, 2012

(54) DATA PROVIDING SYSTEM

(75) Inventor: Masayuki Takezawa, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 500 days.

(21) Appl. No.: 12/292,512

(22) Filed: Nov. 20, 2008

(65) Prior Publication Data
US 2009/0193477 A1  Jul. 30, 2009

(30) Foreign Application Priority Data
Jan. 30, 2008 (JP) .................................. 2008-019504

(51) Int. Cl.
*H04N 7/173* (2011.01)

(52) U.S. Cl. ............ 725/92; 725/94; 725/145; 725/146; 725/147

(58) Field of Classification Search .................. None
See application file for complete search history.

(56) References Cited

U.S. PATENT DOCUMENTS

| | | | |
|---|---|---|---|
| 2002/0007417 A1* | 1/2002 | Taylor et al. | 709/231 |
| 2002/0048264 A1* | 4/2002 | Maegawa | 370/254 |
| 2002/0069420 A1* | 6/2002 | Russell et al. | 725/92 |
| 2002/0154892 A1* | 10/2002 | Hoshen et al. | 386/87 |
| 2004/0010588 A1* | 1/2004 | Slater et al. | 709/224 |
| 2004/0249965 A1* | 12/2004 | Huggins et al. | 709/231 |
| 2004/0255323 A1* | 12/2004 | Varadarajan et al. | 725/25 |
| 2005/0278760 A1* | 12/2005 | Dewar et al. | 725/94 |
| 2006/0294555 A1* | 12/2006 | Xie | 725/88 |
| 2008/0072264 A1* | 3/2008 | Crayford | 725/86 |

FOREIGN PATENT DOCUMENTS

| | | |
|---|---|---|
| JP | 55-071382 | 5/1980 |
| JP | 07-322235 | 12/1995 |
| JP | 2001-511551 | 8/2001 |

* cited by examiner

*Primary Examiner* — Dominic D Saltarelli
*Assistant Examiner* — Jason J Chung
(74) *Attorney, Agent, or Firm* — Rabin & Berdo, P.C.

(57) ABSTRACT

A data providing system in which program deliverers store programs and deliver the stored programs to requesting subscriber terminals has a program allocation control unit that allocates new programs or qualified programs to multiple program deliverers, then selectively deletes the programs from the program deliverers. This allocation scheme assures that even newly added programs can be transmitted efficiently to the subscriber terminals.

12 Claims, 7 Drawing Sheets

| PROGRAM NO. | VIP NO. | VSN NO. |
|---|---|---|
| Pr.1 | 52 | |
| | | |

| PROGRAM NO. | VIP NO. | VSN NO. |
|---|---|---|
| Pr.1 | 52, 53 | 21, 22, 23 |
| | | |

| PROGRAM NO. | VIP NO. | VSN NO. |
|---|---|---|
| Pr.1 | 52, 53 | 21, 22, 23 |
| Pr.2 | 52 | |
| Pr.3 | 52, 53 | 21, 22, 23 |

441 442 443

TIME T

| PROGRAM NO. | VIP NO. | VSN NO. |
|---|---|---|
| Pr.1 | 52, 53 | 21, 22, 23 |
| Pr.2 | 52, 53 | 21, 22, 23 |
| Pr.3 | 52 | 21 |

441 442 443

TIME T+t

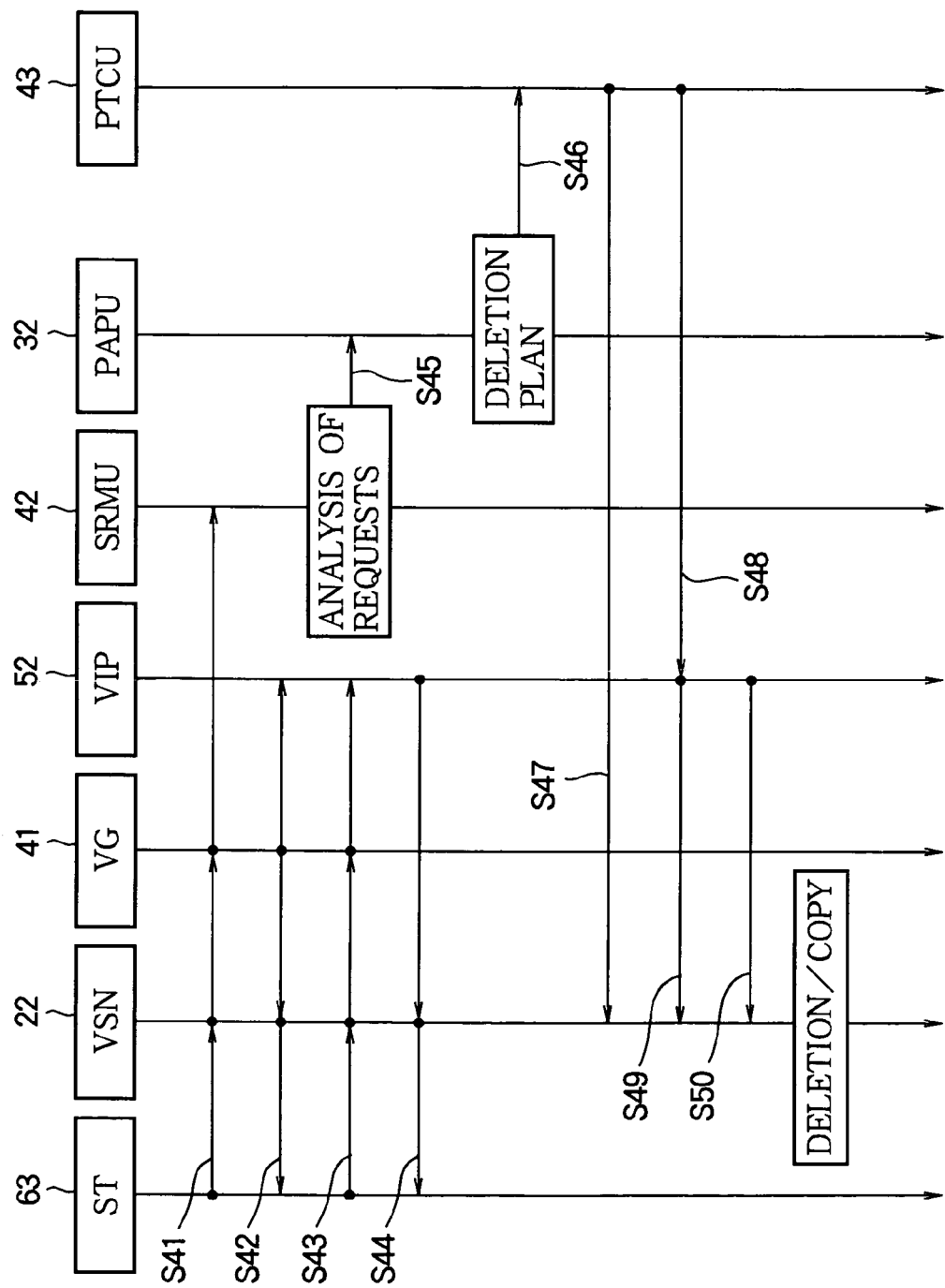

DATA PROVIDING SYSTEM

BACKGROUND OF THE INVENTION

1. Field of the Invention

The present invention relates to a data providing system such as, for example, a video-on-demand system.

2. Description of the Related Art

A conventional video-on-demand (VOD) system described by Nishio et al. in Japanese Patent Application Publication No. 07-322235 includes a plurality of video service nodes, a video gateway, and a video program transfer unit interconnected by a network, and in addition a service request monitoring unit and a reallocation planning unit.

The video service nodes have respective video storage facilities in which video programs can be stored. Some of the video service nodes may be connected to both video information providers and subscriber terminals; other video service nodes may be connected only to subscriber terminals.

The video information providers store and deliver video programs.

The video gateway provides access to a database storing a management table, referred to as a mapping table, that maps video program identification numbers to the identification numbers of the video information providers or video service nodes at which the video programs are stored.

The service request monitoring unit monitors service requests from the subscriber terminals through the video gateway, analyzes the requests, identifies video programs that are requested with high frequency, and identifies video programs with reduced request frequencies.

Based on the results of this analysis, the reallocation planning unit creates a reallocation plan specifying video programs that are to be deleted from their assigned storage locations or reassigned to new storage locations.

The video program transfer unit implements the reallocation plan created by the reallocation planning unit by deleting stored video programs from the storage facilities in the video information providers and video service nodes, transferring video programs to new storage locations in the video information providers and video service nodes, and notifying the video gateway of these change in the allocation of the video programs to the video information providers and video service nodes.

In this conventional VOD system, upon receiving a service request from a subscriber terminal, the video gateway refers to the management table in the database and notifies the corresponding video information provider or video service node of the title of the video program requested by the subscriber terminal. The video information provider or video service node that receives this notification transmits the video program with the specified title to the requesting subscriber terminal.

The service request monitoring unit accordingly monitors and analyzes service requests from the subscriber terminals and the reallocation planning unit decides which video programs to store in which video storage facilities in the network.

In this conventional VOD system, when a video information provider begins providing a new video program, the video program is initially stored only by the video information provider.

When the new video program is first requested from a subscriber terminal, the service request monitoring unit analyzes the request, the reallocation planning unit reallocates the program to the video service node to which the requesting terminal is connected, and the video program transfer unit transfers the video program in its entirety to that single video service node, to be stored in the storage facility of that video service node.

When new video programs are supplied in a steady stream, however, this method of assigning them to storage facilities purely on the basis of requests from subscriber terminals leads to an erratic distribution of storage locations, and inefficient sharing of the video program transmission load.

SUMMARY OF THE INVENTION

An object of the present invention is to provide a more efficient scheme for distributing the program transmission load in a video-on-demand system, or more generally in any data providing system that delivers programs to subscriber terminals.

A data providing system according to the present invention includes a plurality of program deliverers that store programs, select stored programs requested by subscriber terminals, and deliver the selected program to the requesting subscriber terminals. The system also includes a program allocation control unit that controls the allocation of qualified programs so that each qualified program is allocated to at least two of the program deliverers.

The qualified programs may include all programs newly added to the system, or programs satisfying a prescribed condition.

The program allocation control unit may also arrange to have programs deleted from some of the program deliverers in which they are stored.

A program may be stored in its entirety in each of the program deliverers to which it is allocated, or different parts of the program may be allocated to different program deliverers.

By allocating programs to multiple program delivers, the invented data providing system ensures that the programs can be transmitted efficiently to the subscriber terminals.

By then deleting programs from program deliverers that receive relatively few requests for the programs, the invented data providing system can also make efficient use of storage space in the program deliverers.

BRIEF DESCRIPTION OF THE DRAWINGS

In the attached drawings:

FIG. 2A illustrates exemplary management data stored in the database when a new program is added to the video-on-demand system in FIG. 1;

FIG. 2B illustrates exemplary management data stored in the database when the new program is transferred to all program deliverers in the first embodiment;

FIG. 5A illustrates management data before an update of the database in FIG. 1;

FIG. 5B illustrates the management data in FIG. 5A after the update;

FIG. 7 illustrates a program transfer and reallocation sequence responsive to a service request from the subscriber terminal in FIG. 6.

DETAILED DESCRIPTION OF THE INVENTION

Figure 1:
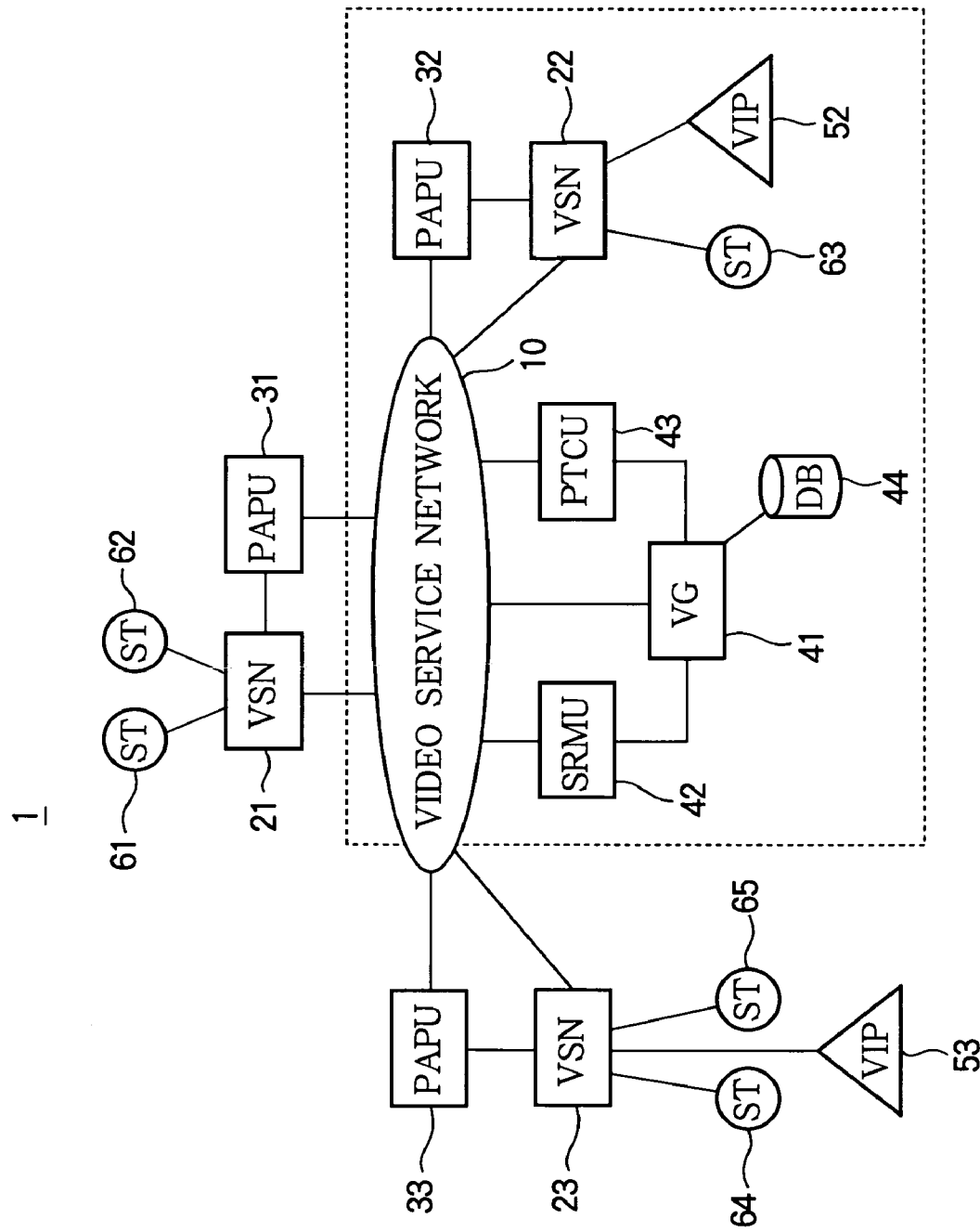
FIG. 1 is a block diagram illustrating the structure of a video-on-demand system according to an embodiment of the invention.

An embodiment of the invention will now be described with reference to the attached drawings, in which like elements are indicated by like reference characters. The data providing system in the embodiment is a video-on-demand system.

Referring to FIG. 1, the VOD system 1 has a plurality of video service nodes (VSNs) 21, 22, 23, a plurality of program allocation planning units (PAPUs) 31, 32, 33, a video gateway (VG) 41, a service request monitoring unit (SRMU) 42, and a program transfer control unit (PTCU) 43, which are interconnected through a video service network 10. The video gateway (VG) 41 is also connected directly to the service request monitoring unit (SRMU) 42 and program transfer control unit 43, and is further connected to a database (DB) 44.

Video service node 21 is connected to a plurality of subscriber terminals (STs) 61, 62. Video service node (VSN) 22 is connected to a video information provider 52 and a subscriber terminal 63. Video service node 23 is connected to another video information provider 53 and a plurality of subscriber terminals 64, 65.

The video service network 10 can be divided into two logical components: a network for transferring programs, and a network for transferring control signals. Service requests from the subscriber terminals 61-65 are sent to the video gateway 41 via the logical control signal network part of the video service network 10.

The database 44 stores a management table, referred to as a mapping table, that maps video program identification numbers to the identification numbers of the video information providers or video service nodes at which the video programs are stored. FIGS. 2A and 2B show examples of the content of the mapping table 440.

The mapping table 440 relates program numbers to video information provider numbers and video service node numbers. The program number column 441 lists identification numbers (as shown) or other identification information designating programs. The video information provider number column 442 gives identification information numbers (as shown) or other identification information designating the video information provider or providers storing each program. The video service node number column 443 gives identification information numbers (as shown) or other identification information designating the video service node or nodes storing the program.

The database 44 storing the mapping table 440 is accessed and updated by the video gateway 41.

Referring again to FIG. 1, the video gateway 41 receives service requests from the subscriber terminals 61-65, and based on the mapping table 440 in the database 44, notifies the video information providers 52, 53, or the video service nodes 21, 22, 23 of the title of the requested program.

When the video gateway 41 receives service requests from the subscriber terminals 61-65, it also sends them to the service request monitoring unit 42.

The video gateway 41 updates the mapping table 440 in the database 44 according to information provided from the program transfer control unit 43, as described later.

The video information providers 52, 53, or the video service nodes 21, 22, or 23 receive notifications from the video gateway 41 and transmit the specified programs to the subscriber terminals 61-65.

The service request monitoring unit 42 analyzes service requests reported by the video gateway 41 to identify programs that are requested with high frequency from the subscriber terminals 61-65 and programs with reduced request frequencies, for each of the video information providers 52, 53 and video service nodes 21, 22, 23, and sends the results of its analysis to the program allocation planning units 31, 32, 33.

From among the programs stored in the video storage facilities of the video service nodes 21, 22, 23 connected to the program allocation planning units 31, 32, 33, the program allocation planning units 31, 32, 33 select programs with reduced request frequencies from the subscriber terminals 61-65 connected to the video service nodes 21, 22, 23 as programs to be deleted.

When a program is stored in one of the video information providers 52, 53 or video service nodes 21, 22, 23, the program transfer control unit 43 may transfer the program to all of the other video information providers 52, 53 and video service nodes 21, 22, 23 via the video service network 10. The program transfer control unit 43 may also delete a selected program stored in a video information provider 52, 53 or video service node 21, 22, 23, and/or transfer the program to another video information provider 52, 53 or video service node 21, 22, 23. After transferring or deleting a program, the program transfer control unit 43 notifies the video gateway 41 of the change in the allocation of the program to video storage facilities.

In this embodiment, the video information providers 52, 53 and video service nodes 21, 22, 23 store programs, select stored programs requested by a connected subscriber terminal (service request), and deliver the selected program to the requesting subscriber terminal.

The video information providers 52, 53 function as first deliverers, and have program storage facilities or video storage facilities (not shown) for storing programs.

The video service nodes 21, 22, 23 function as second deliverers that deliver (transfer) programs supplied by video information providers (the first deliverers) to the subscriber terminals. The video service nodes 21, 22, 23 have video storage facilities that can store all or a part of a program transferred from a video information provider (first deliverer). When the program is requested from a subscriber terminal, the video service node 21, 22, or 23 reads the stored program or the stored part of the program from its video storage facility and delivers (transmits) the program to the requesting subscriber terminal.

The video gateway 41, the service request monitoring unit 42, the program allocation planning units 31, 32, 33, and the program transfer control unit 43 operate together as a program allocation control unit that controls allocation of programs satisfying a predefined condition to at least two of the program deliverers.

In the embodiment, the programs satisfying the predefined condition include programs that are newly uploaded to a video information provider (first deliverer), and programs that are already stored in one or more of the program deliverers 21, 22, 23, 52, 53 and are requested with high frequency from the subscriber terminals. These programs will also be referred to as qualified programs below.

Programs satisfying the predefined condition are allocated to at least two program deliverers, and may be allocated to all of the program deliverers.

In the minimum configuration, there may be only two program deliverers, at least one of which is a first deliverer, that is, a video information provider in which new programs can be stored.

In the example in FIG. 1, when a new program is stored in the video information provider 52, it may be allocated to, for example, the two video information providers 52, 53. Alternatively, it may be allocated to video information provider 52 and video service node 22, to both video information providers 52, 53 and their connected video service nodes 22, 23, or to both video information providers 52, 53 and all of the video service nodes 21, 22, 23. The program deliverers to which a new program is allocated are determined on the basis of preset information including identification information that specifically identifies the program deliverers to which the program is to be allocated.

The program allocation control unit, that is, the video gateway 41, the service request monitoring unit 42, the program allocation planning units 31, 32, 33, and the program transfer control unit 43, also controls the deletion of programs from the program deliverers. The programs to be deleted are determined on the basis of the frequency with which they are requested.

The service request monitoring unit 42 functions as a program delivery request analyzer that analyzes the frequency of requests for delivery of qualified programs stored in some or all of the program deliverers.

The program allocation planning units 31, 32, 33 function as a program allocation planning unit that creates a plan for the deletion of qualified programs stored in these program deliverers, based on results of the analysis by the service request monitoring unit 42.

The program transfer control unit 43 functions as a program disposal control unit that controls deletion of programs from these program deliverers according to the plan created by the program allocation planning units 31, 32, 33.

The program transfer control unit 43 also stores program destination information designating the program deliverers to which programs are to be transferred and the sequence in which the transfers are to be made. On the basis of this information, the program transfer control unit 43 issues instructions of the program deliverers to send the qualified programs (new programs, for example) to the appropriate destinations.

The allocation control process when a new program is added to the VOD system 1 will now be described with reference to the sequence diagram in FIG. 3.

Figure 3:
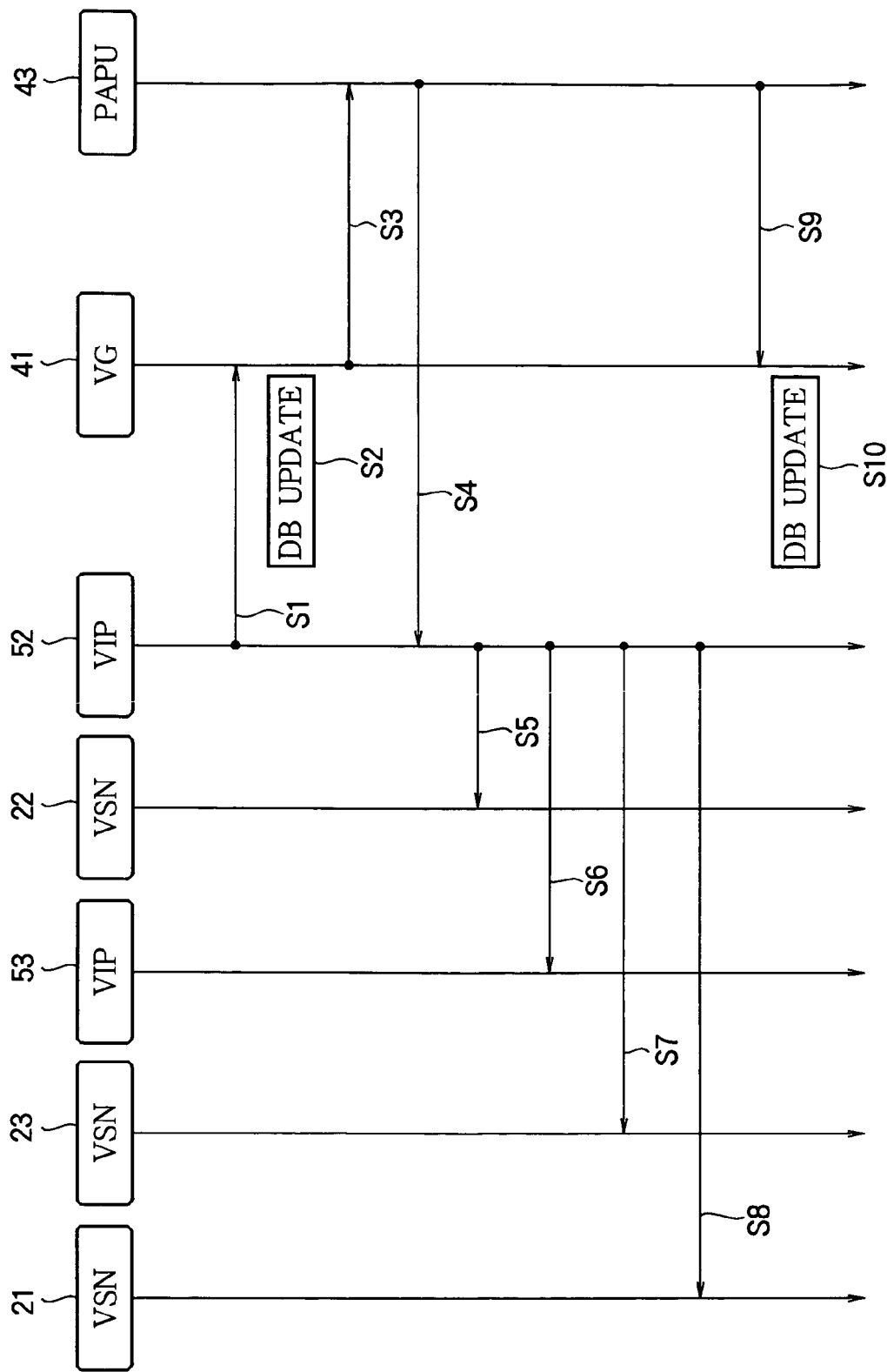
FIG. 3 illustrates an allocation control sequence for a newly added program in the video-on-demand system in FIG. 1.

In FIG. 3, the new program is added at video information provider 52, then allocated additionally to video information provider 53 and all of the video service nodes 21, 22, 23, so that the program is stored by all of the program deliverers.

When the new program is uploaded to and newly stored in video information provider 52, video information provider 52 notifies the video gateway 41 (step S1). The notification includes the identification information (program number) of the new program.

On the basis of this notification, the video gateway 41 updates the mapping table 440 in the database 44 (step S2).

For example, the video gateway 41 stores identification information designating the new program (its program number Pr.1, for example; the identification information is contained in the notification) in the program number column 441 in FIG. 2A, and stores identification information (a number, for example) designating the video information provider 52 from which the notification was received in the video information provider number column 442. No information is stored in the video service node number column 443 yet.

Next, the video gateway 41 notifies the program transfer control unit 43 that the new program should be transferred to the predetermined destinations (step S3).

In this example, the predetermined destinations are all the program deliverers except the program deliverer (video information provider) that initially acquired the new program, but in the general case, the predetermined destinations may be any one or more program deliverers other than the program deliverer (video information provider) that initially acquired the new program.

The program transfer control unit 43 now refers to its internally stored program destination information and instructs video information provider 52 to transfer the new program to the program deliverers specified in this information, in a sequence also listed in the information (step S4).

In this example, the new program is allocated to all the plurality of program deliverers, so the program destination information specifies all program deliverers. The program destination information includes identification information designating each of the video information providers and video service nodes to which the program is to be transferred. Since the program is already stored in video information provider 52, the program must be transferred from video information provider 52 to video information provider 53 and video service nodes 21, 22, 23. The program destination information indicates the sequence in which these program transfers are to be made. The program transfer control unit 43 furnishes this information to video information provider 52 in step S4.

On instruction from the program transfer control unit 43, video information provider 52 sends entire copies of the new program first to the video service node 22 to which video information provider 52 is connected, then to the other video information provider 53, then to the video service node 23 to which video information provider 53 is connected, and finally to video service node 21 (steps S5, S6, S7, and S8). Video information provider 53 and the video service nodes 21, 22, 23 receive these copies of the new program from the video information provider 52 and store them in their own video storage facilities.

After video information provider 53 and the video service nodes 21, 22, 23 have received and stored the new program, they send acknowledging signals to notify the video information provider 52 that they have stored the new program.

When the video information provider 52 has received these notifications from all destinations of the new program, the video information provider 52 notifies the program transfer control unit 43 that the new program has been delivered to all destinations. The program transfer control unit 43 then notifies the video gateway 41 that the program has been transferred to all destinations designated in the program destination information, and asks the video gateway 41 to update its program allocation information (step S9).

Upon receiving this notification, including the program destination information, from the program transfer control unit 43, the video gateway 41 updates the mapping table 440 in the database 44 (step S10). In the present example, as shown in FIG. 2B, the video gateway 41 leaves the content of the program number column 441 unchanged (Pr.1), but adds the identification information of video information provider 53 to the video information provider number column 442 and the identification information of the video service nodes 21, 22, 23 to the video service node number column 443.

In the example in FIG. 3, the video information provider 52 that stores a new program transfers the program to all other destinations (the other video information provider 53 and the video service nodes 21, 22, 23), but the new program can be transferred in other ways. For example, the video information provider that initially stores a new program may transfer the program to another video information provider or a video service node and that provider or node may then transfer the program to one or more further video information providers or video service nodes. This process may continue until the program has been stored in all video information providers and/or video service nodes designated as allocation destinations of the program.

Figure 4A:
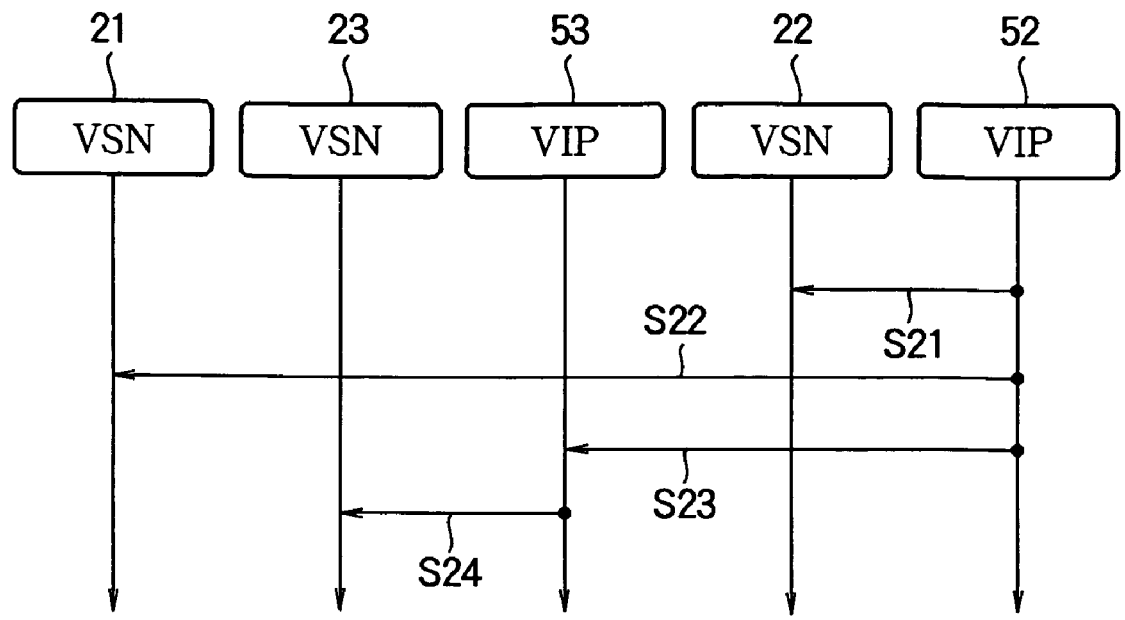
FIGS. 4A and 4B illustrate variations of the program transfer steps in FIG. 3.

In the example shown in FIG. 4A, video information provider 52 transfers the new program to connected video service node 22, to a distant video service node 21, and to the other video information provider 53 (steps S21, S22, S23), and video information provider 53 then transfers the program to connected video service node 23 (step S24).

Figure 4B:
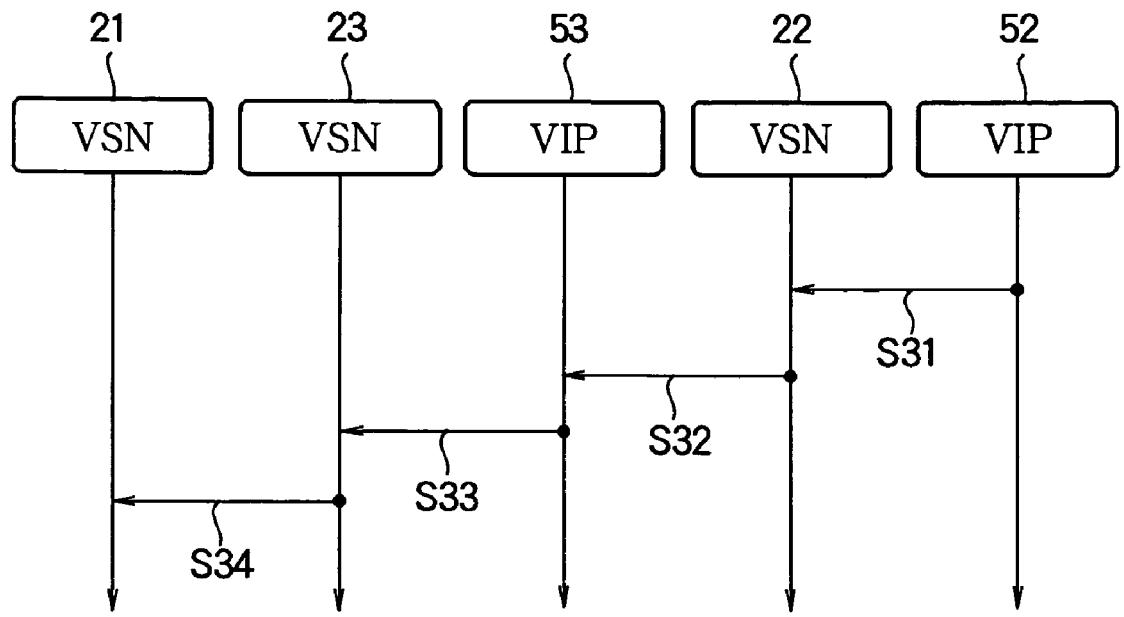

In the alternative example shown in FIG. 4B, video information provider 52 transfers the new program to connected video service node 22 (step S31), video service node 22 then transfers the program to the other video information provider 53 (step S32), video information provider 53 transfers the received program to connected video service node 23 (step S33), and finally video service node 23 transfers the program to video service node 21 (step S34).

In both of these examples, video information provider 53 and the video service nodes 21, 22, 23 all store the new program in their respective video storage facilities.

After program Pr.1 has been stored in all of the program deliverers, if further new programs Pr.2 and Pr.3 are acquired by one or the other of the video information providers 52, 53, these programs are allocated to multiple destinations and are transferred and stored in those destinations in manner similar to program Pr.1, so that each new program is stored in at least two program deliverers.

When the subscriber terminals 61-65 make service requests (program delivery requests) for programs Pr.1, Pr.2, and Pr.3, the program transfer control unit 43 sends program transfer control signals to the video information providers 52, 53 and video service node 21, 22, 23 via the video service network 10. Over time, the program transfer control unit 43 also deletes programs from video service nodes that receive few requests for the program, or from video information providers connected to those video service nodes.

Before deleting a program from a video service node or video information provider that is receiving few requests for the program, the program transfer control unit 43 may also transfer the program to another video service node or video information provider that is receiving more requests for the program. Similarly, after deleting a program from a video service node or video information provider, the program transfer control unit 43 may transfer another program to the video service node or video information provider to replace the deleted program. After any such program deletions or transfers, the program transfer control unit 43 notifies the video gateway 41, and the video gateway 41 updates the mapping table 440 in the database 44.

FIGS. 5A and 5B illustrate an exemplary update of the mapping table 440 by the video gateway 41. FIG. 5A shows the mapping table 440 at a time T before the update; FIG. 5B shows the mapping table 440 at a time T+t after the update.

In FIG. 5A, three programs having program numbers Pr.1, Pr.2, Pr.3 are stored in the system. Programs Pr.1 and Pr.3 are stored in both video information providers 52, 53 and all the video service nodes 21, 22, 23. Program Pr.2 is stored only in video information provider 52.

From this state, frequent requests for programs Pr.1 and Pr.2 and a reduced rate of requests for program Pr.3 lead to the reallocation shown in FIG. 5B. Program Pr.1 remains stored in both video information providers 52, 53 and all the video service nodes 21, 22, 23, as at time T. Program Pr.2 remains stored in video information provider 52 and has also been added to the video storage facilities of video information provider 53 and the video service nodes 21, 22, 23. Program Pr.3 has been deleted from the video storage facilities of video information provider 53 and video service nodes 22 and 23, and is now stored only at video information provider 52 and video service node 21.

Starting from the state in FIG. 2A, in response to the notification from the program transfer control unit 43, the video gateway 41 has changed the mapping table 440 in the database 44 to the content shown in FIG. 2B, then to the content shown in FIG. 5A, and then to the content shown in FIG. 5B.

Next, the transfer and reallocation of a program according to a service request from a subscriber terminal will be described. This operation will involve the units enclosed by the dotted line in FIG. 1. For clarity, this part of the VOD system 1 is shown separately in FIG. 6. The program transfer and reallocation sequence is shown in FIG. 7.

Figure 6:
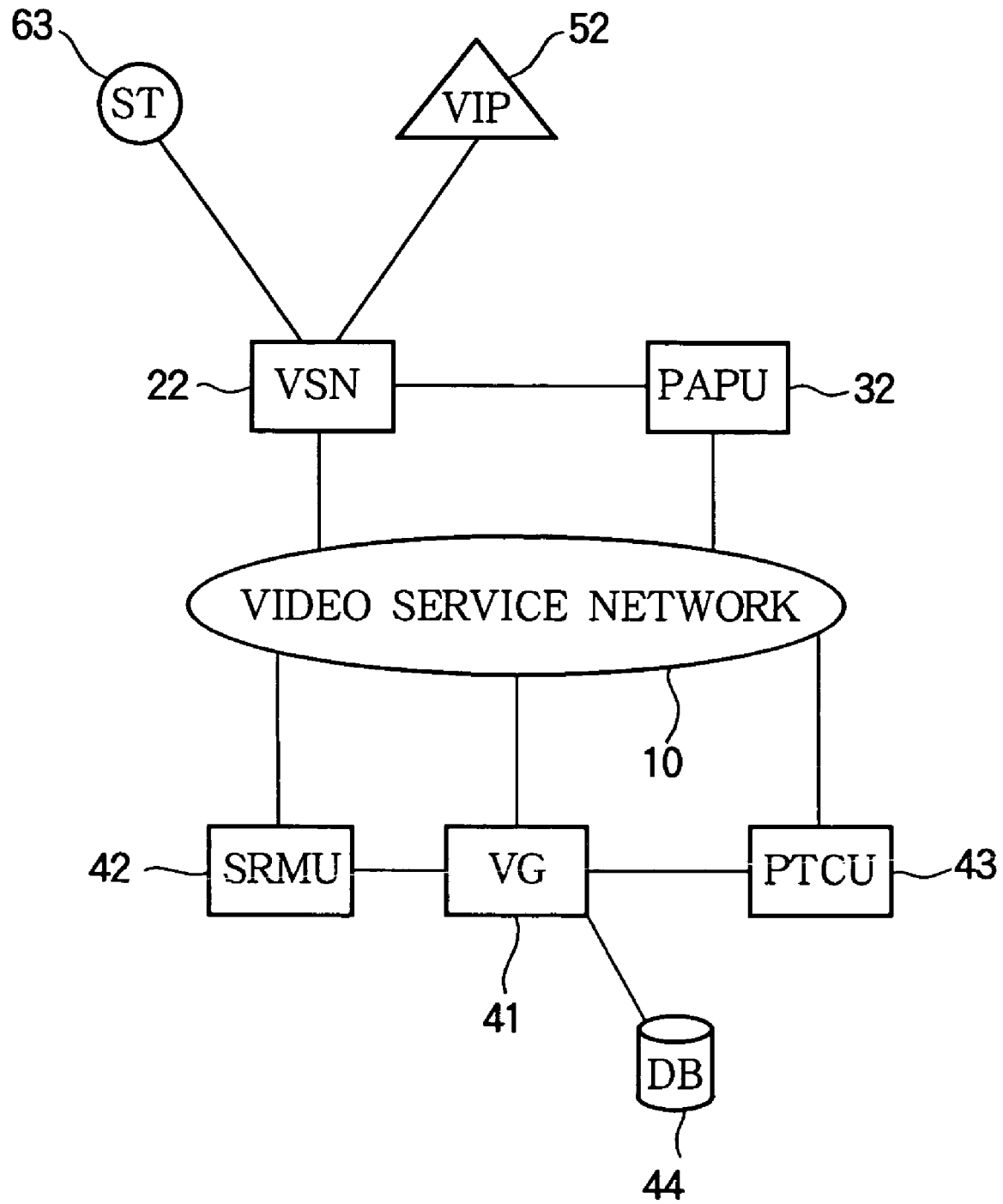
FIG. 6 is a redrawing of the part of the video-on-demand system surrounded by the dotted line in FIG. 1.

The program in question is stored in video information provider 52 in FIG. 6 and is requested by subscriber terminal 63.

As shown in FIG. 7, a service request signal specifying video information provider 52 is transferred from subscriber terminal 63 through video service node 22 and the video service network 10 to the video gateway 41 (step S41).

The video gateway 41 establishes connections for program selection signals, for control signals for functions similar to the control functions in a video cassette recorder, and for program transfer. Specifically, operating via the video service network 10, the video gateway 41 informs video information provider 52 of the network address of subscriber terminal 63, establishes a connection for the exchange of control signals between subscriber terminal 63 and video information provider 52, and controls video service node 22 to establish a connection for program transfer between subscriber terminal 63 and video information provider 52 (step S42).

Subscriber terminal 63 now sends a program selection request to the video gateway 41 via video service node 22 and video service network 10 (step S43).

The video gateway 41 analyzes the program selection signal received from subscriber terminal 63, refers to the mapping table 440 in the database 44, identifies the storage location of the selected program, and notifies video information provider 52 of the title of the selected program. The video gateway 41 also reports this request to the service request monitoring unit 42, as indicated generally by the arrow from the video gateway 41 to the service request monitoring unit 42 in step S41.

The program is stored in a compressed digital form in the video storage facility of video information provider 52, and may be available subject to conditions stated in a contract with subscriber terminal 63. If these conditions permit, video information provider 52 reads the selected program from its video storage facility and sends the program in real time to video service node 22. Video service node 22 transfers the program from video information provider 52 to subscriber terminal 63 (step S44), also in real time. The program is then reproduced by the subscriber terminal 63.

During the reproduction of the program, the subscriber terminal 63 may send control requests, which are transmitted via video service node 22 and the video service network 10 to the video gateway 41. The video gateway 41 sends appropriate signals to the video information provider 52 via the video service network 10 and video service node 22.

The service request monitoring unit 42 analyses the program requests reported from the video gateway 41 to identify programs that the subscriber terminals are requesting with reduced frequency, and sends the results of its analysis to program allocation planning unit 32 (step S45).

The program allocation planning unit 32 uses the results of the service request analysis made by the service request monitoring unit 42 to decide when to delete under-requested programs from the video service node 22, and sends its decisions to the program transfer control unit 43 in the form of a deletion timing plan, which may also include plans for transfer of more frequently requested programs to the video service node 22 (step S46).

The program transfer control unit 43 sends program deletion signals, program copy generation signals, switch control signals, and program transfer signals over the video service network 10, based on the plan created by the program allocation planning unit 32. In the present example, the program transfer control unit 43 sends video service node 22 a program deletion signal via the video service network 10, instructing video service node 22 to delete a program stored in the video storage in the video service node 22 (step S47) and sends video information provider 52 a program copy generation signal (step S48) instructing video information provider 52 to send video service node 22 a copy of, for example, the program selected by subscriber terminal 63 in step S44.

Next, the program transfer control unit 43 sends switch control and program copy control signals via the video service network 10 to video information provider 52. In response to these signals, video information provider 52 establishes a channel for transfer of the copy of the program to video service node 22 (step S49), and then transfers the copy (step S50).

As a result of this reallocation, the next time this program is requested by subscriber terminal 63, the program can be transferred directly from video service node 22 to subscriber terminal 63. More generally, by monitoring service requests from the subscriber terminals and transferring and deleting programs accordingly, the VOD system 1 can maintain an optimal allocation of programs among the program deliverers.

The embodiment above has illustrated a simple scheme in which all new programs are initially stored in all program deliverers, and infrequently requested programs are then deleted selectively from some of the program deliverers, but the invention is not limited to this scheme. For example, new programs may be transferred to predetermined subsets of the program deliverers instead of to all of the program deliverers. Alternatively, the frequency of requests for new programs may be predicted on the basis of requests for similar programs in the past, and only programs that are expected to be requested frequently may be transferred to all program deliverers, or the number of program deliverers to which a new program is initially transferred may be determined according to its predicted request frequency.

Similarly, if a program that has declined in popularity and is currently stored at only one or a few program deliverers experiences a resurgence of popularity, it may be transferred to a number of additional program deliverers, and this number may be determined according to the rate at which requests are received.

In this embodiment, every video service node has a program allocation planning unit, but this is not a requirement. Any configuration in which at least one video service node has a program allocation planning unit is possible.

In this embodiment, copies of a program were transferred one at a time, but multiple copies may be transferred at the same time to different video service nodes and/or video information providers by multicast communication.

A program need not be transferred from a video information provider to a video service node in its entirety. For example, only the initial part of the program may be transferred to the video service node. This enables the video service node to respond quickly to requests from subscriber terminals. While the video service node is sending a subscriber terminal the initial part of the program, the video information provider can be preparing to provide the remaining part.

By monitoring and analyzing service requests from the subscriber terminals and allocating video programs to video storage facilities in different program deliverers accordingly, the VOD system 1 can balance the program transmission load on the program deliverers, thereby improving service and reducing operating costs to the video information providers.

By storing qualified programs in multiple program deliverers from the outset, the VOD system 1 can quickly arrive at an optimal program allocation, and can provide speedy service even for new programs.

The invention is not limited to video-on-demand systems; it is also applicable to systems that provide other types of data, such as audio programs or a mixture of audio and video programs.

Those skilled in the art will recognize that further variations are possible within the scope of the invention, which is defined in the appended claims.

What is claimed is:

1. A content delivery system, comprising:
   first and second content deliverers each storing a plurality of contents;
   a third content deliverer that
      receives one of the plurality of contents transmitted from one of the first and second content deliverers, and transfers the received content to a first terminal, and
      stores the received content, and, responsive to a delivery request from the first terminal, transmits the stored content to the first terminal;
   a fourth content deliverer that
      receives one of the plurality of contents transmitted from one of the first and second content deliverers, and transfers the received content to a second terminal,
      stores the received content, and, responsive to a delivery request from the second terminal, transmits the stored content to the second terminal;
   a gateway;
   a transfer control unit;
   a service request monitoring unit; and
   an allocation planning unit, wherein
   the first content deliverer stores a new content, and transmits to the gateway first storage information indicating that the new content has been stored;
   the gateway transmits to the transfer control unit a first notification including the first storage information;
   the transfer control unit, responsive to the first notification, transmits to the first content deliverer a second notification requesting that the first content deliverer transmits the new content to the second, third and fourth content deliverers;
   the first content deliverer, responsive to the second notification, transmits the new content to the second, third and fourth content deliverers;
   the third content deliverer transmits a service request from the first terminal to the gateway;
   the gateway transmits the service request to the service request monitoring unit;

the service request monitoring unit transmits, to the allocation planning unit, an analysis indicating that requests for contents from the first terminal have been reduced;

the allocation planning unit, responsive to the analysis, transmits to the transfer control unit a result indicating one of the contents stored in the third content deliverer for which service requests from the first terminal have been less frequent;

the transfer control unit transmits to the third content deliverer a deletion request for deletion of the indicated content; and the third content deliverer deletes the indicated content in accordance with to the deletion request.

2. The content delivery system of claim 1, further comprising a database that stores management data including content identification information and deliverer identification information identifying one of content deliverers storing a content identified by the content identification information, the gateway updating the management data based on the first storage information received from the first content deliverer.

3. The content delivery system of claim 2, wherein the second, third and fourth content deliverers store the new content received from the first content deliverer, and transmit, to the first content deliverer, storage completion information indicating that storage of the new content has been completed;

the first content deliverer transmits, to the transfer control unit, transfer completion information indicating that the new content has been transmitted to the second, third and fourth content deliverers;

the transfer control unit transmits, to the gateway, second storage information indicating that the new content has been stored in the second, third and fourth content deliverers; and the gateway updates the management data in the database based on the second storage information.

4. The content delivery system of claim 1, wherein the second notification includes a sequence in which the new content is to be transferred to the second, third and fourth content deliverers.

5. The content delivery system of claim 4, wherein the first content deliverer successively transmits the new content to the third content deliverer, the second content deliverer and the fourth content deliverer in accordance with the second notification.

6. The content delivery system of claim 4, wherein the first content deliverer transmits the new content to the third content deliverer in accordance with the second notification;

the third content deliverer transmits the new content to the second content deliverer; and the second content deliverer transmits the new content to the fourth content deliverer.

7. A content delivery control method of a content delivery system, the content delivery system including first and second content deliverers each storing a plurality of contents, a third content deliverer that receives one of the plurality of contents transmitted from one of the first and second content deliverers, and transfers the received content to a first terminal, and stores the received content, and, responsive to a delivery request from the first terminal, transmits the stored content to the first terminal, a fourth content deliverer that receives one of the plurality of contents transmitted from one of the first and second content deliverers, and transfers the received content to a second terminal, stores the received content, and, responsive to a delivery request from the second terminal, transmits the stored content to the second terminal, a gateway, a transfer control unit, a service request monitoring unit, and an allocation planning unit, said method comprising:

the first content deliverer storing a new content, and transmitting to the gateway first storage information indicating that the new content has been stored;

the gateway transmitting to the transfer control unit a first notification including the first storage information;

the transfer control unit, responsive to the first notification, transmitting to the first content deliverer a second notification requesting that the first content deliverer transmits the new content to the second, third and fourth content deliverers;

the first content deliverer, responsive to the second notification, transmitting the new content to the second, third and fourth content deliverers;

the third content deliverer transmitting a service request from the first terminal to the gateway;

the gateway transmitting the service request to the service request monitoring unit;

the service request monitoring unit transmitting, to the allocation planning unit, an analysis indicating that requests for contents from the first terminal have been reduced;

the allocation planning unit, responsive to the analysis, transmitting to the transfer control unit a result indicating one of the contents stored in the third content deliverer for which service requests from the first terminal have been less frequent;

the transfer control unit transmitting to the third content deliverer a deletion request for deletion of the indicated content; and the third content deliverer deleting the indicated content in accordance with to the deletion request.

8. The content delivery control method of claim 7, further comprising:

providing a database that stores management data including content identification information and deliverer identification information identifying one of content deliverers storing a content identified by the content identification information, and the gateway updating the management data based on the first storage information received from the first content deliverer.

9. The content delivery control method of claim 8, further comprising:

the second, third and fourth content deliverers storing the new content received from the first content deliverer, and transmitting, to the first content deliverer, storage completion information indicating that storage of the new content has been completed;

the first content deliverer transmitting, to the transfer control unit, transfer completion information indicating that the new content has been transmitted to the second, third and fourth content deliverers;

the transfer control unit transmitting, to the gateway, second storage information indicating that the new content has been stored in the second, third and fourth content deliverers; and the gateway updating the management data in the database based on the second storage information.

10. The content delivery control method of claim 7, wherein the second notification includes a sequence in which the new content is to be transferred to the second, third and fourth content deliverers.

11. The content delivery control method of claim 10, further comprising the first content deliverer successively transmitting the new content to the third content deliverer, the second content deliverer and the fourth content deliverer in accordance with the second notification.

12. The content delivery control method of claim 10, further comprising:
- the first content deliverer transmitting the new content to the third content deliverer in accordance with the second notification;
- the third content deliverer transmitting the new content to the second content deliverer; and
- the second content deliverer transmitting the new content to the fourth content deliverer.

\* \* \* \* \*